US012567099B2

(12) United States Patent
Burke, Jr. et al.

(10) Patent No.: US 12,567,099 B2
(45) Date of Patent: Mar. 3, 2026

(54) MACHINE LEARNING COLLABORATION TECHNIQUES

(71) Applicant: Adobe Inc., San Jose, CA (US)

(72) Inventors: Robert W. Burke, Jr., Georgetown, TX (US); Ronald Oribio, Austin, TX (US); Michele Saad, Austin, TX (US); Irgelkha Mejia, Round Rock, TX (US)

(73) Assignee: Adobe Inc., San Jose, CA (US)

( * ) Notice: Subject to any disclaimer, the term of this patent is extended or adjusted under 35 U.S.C. 154(b) by 252 days.

(21) Appl. No.: 18/335,921

(22) Filed: Jun. 15, 2023

(65) Prior Publication Data

US 2024/0420212 A1      Dec. 19, 2024

(51) Int. Cl.
   *G06Q 30/00*      (2023.01)
   *G06F 40/20*      (2020.01)
   *G06Q 30/0601*      (2023.01)

(52) U.S. Cl.
   CPC ......... *G06Q 30/0631* (2013.01); *G06F 40/20* (2020.01); *G06Q 30/0627* (2013.01); *G06Q 30/0633* (2013.01)

(58) Field of Classification Search
   None
   See application file for complete search history.

(56) References Cited

U.S. PATENT DOCUMENTS 7,647,247 B2    1/2010  Abraham et al.
9,754,298 B2    9/2017  Chavie et al.

| | | | |
|---|---|---|---|
| 12,008,621 B1 * | 6/2024 | Atef | G06F 16/953 |
| 2013/0066750 A1 | 3/2013 | Siddique et al. | |
| 2013/0211953 A1 | 8/2013 | Abraham et al. | |
| 2021/0224858 A1 * | 7/2021 | Khoury | G06Q 30/0276 |
| 2025/0123883 A1 * | 4/2025 | Wardell | G06F 40/30 |

OTHER PUBLICATIONS

B. spaces by Battat—Kids Wooden Two Step Stool—Peek-a-Boost—Mint & Wood, Downloaded from https://a.co/d/5E5xuQI on Jun. 12, 2023, 10 pages.

* cited by examiner

*Primary Examiner* — Mila Airapetian
(74) *Attorney, Agent, or Firm* — Kilpatrick Townsned & Stockton LLP

(57) ABSTRACT

A feedback management subsystem receives, from a first user, first text comprising commentary on an item. The feedback management subsystem receives, from the first user, instructions to request commentary on the item from a second user. Responsive to receiving the instructions to request commentary from the second user, a communication subsystem transmits a notification to the second user. The feedback management subsystem receives, from the second user, second text comprising commentary on the item. A first machine learning model performs sentiment analysis to identify sentiments of the first text and the second text. A recommendation subsystem identifies prior actions of the first user and associated sentiments of the second user. A second machine learning model identifies a second item based on the prior actions of the first user and the sentiments of the second user. The recommendation subsystem provides output to the first user recommending the second item.

17 Claims, 11 Drawing Sheets

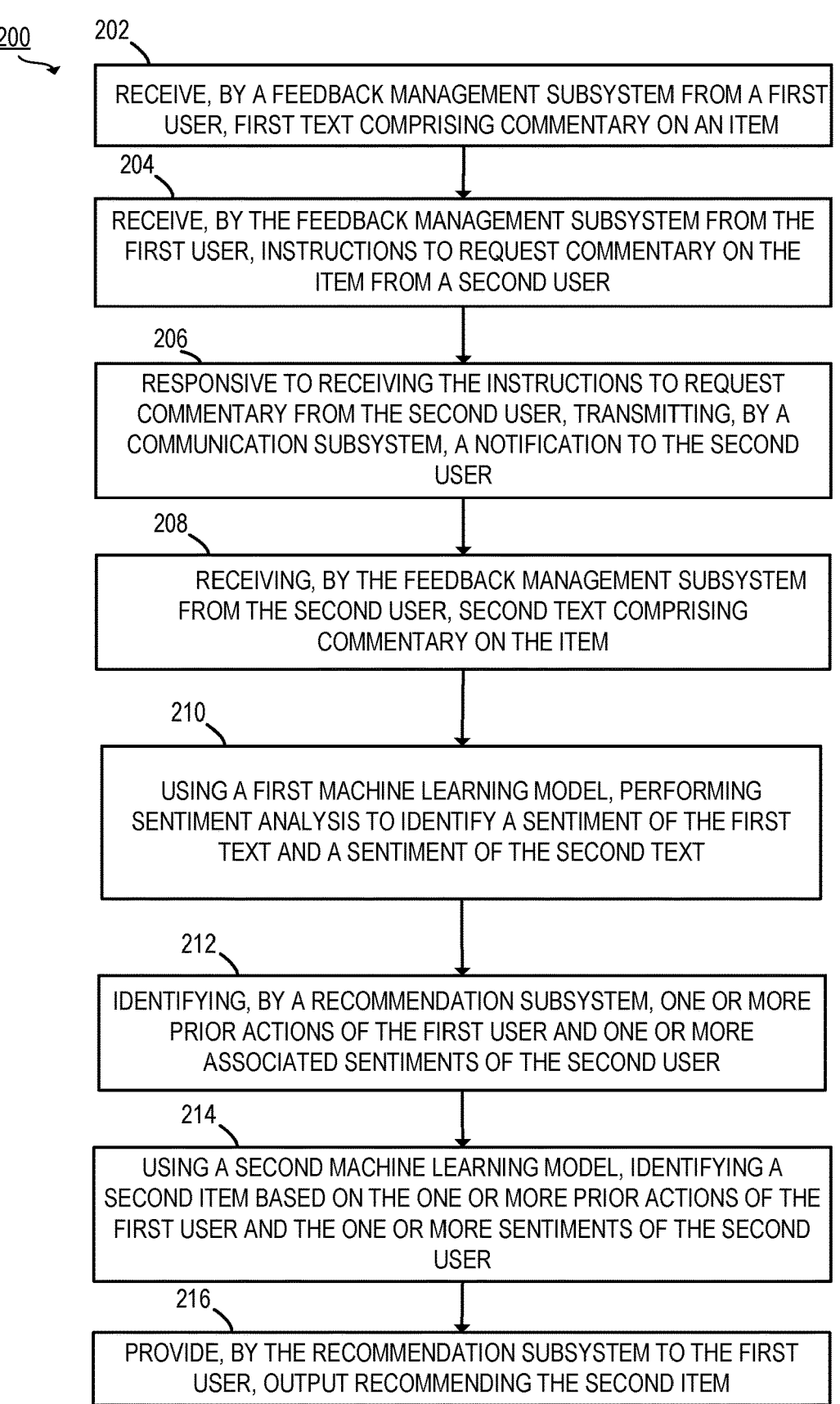

200

202

RECEIVE, BY A FEEDBACK MANAGEMENT SUBSYSTEM FROM A FIRST USER, FIRST TEXT COMPRISING COMMENTARY ON AN ITEM

204

RECEIVE, BY THE FEEDBACK MANAGEMENT SUBSYSTEM FROM THE FIRST USER, INSTRUCTIONS TO REQUEST COMMENTARY ON THE ITEM FROM A SECOND USER

206

RESPONSIVE TO RECEIVING THE INSTRUCTIONS TO REQUEST COMMENTARY FROM THE SECOND USER, TRANSMITTING, BY A COMMUNICATION SUBSYSTEM, A NOTIFICATION TO THE SECOND USER

208

RECEIVING, BY THE FEEDBACK MANAGEMENT SUBSYSTEM FROM THE SECOND USER, SECOND TEXT COMPRISING COMMENTARY ON THE ITEM

210

USING A FIRST MACHINE LEARNING MODEL, PERFORMING SENTIMENT ANALYSIS TO IDENTIFY A SENTIMENT OF THE FIRST TEXT AND A SENTIMENT OF THE SECOND TEXT

212

IDENTIFYING, BY A RECOMMENDATION SUBSYSTEM, ONE OR MORE PRIOR ACTIONS OF THE FIRST USER AND ONE OR MORE ASSOCIATED SENTIMENTS OF THE SECOND USER

214

USING A SECOND MACHINE LEARNING MODEL, IDENTIFYING A SECOND ITEM BASED ON THE ONE OR MORE PRIOR ACTIONS OF THE FIRST USER AND THE ONE OR MORE SENTIMENTS OF THE SECOND USER

216

PROVIDE, BY THE RECOMMENDATION SUBSYSTEM TO THE FIRST USER, OUTPUT RECOMMENDING THE SECOND ITEM

Free Shipping
Get it between Mon. Oct 17 - Sun. Oct 23
Ship to : 07512 - Totowa ⌄

404

408

- 1 +     ♡     ▭

406

Add to cart

800

900

901 — 6 collaborations > Kitchen dining

8- Person Cedar Solid Wood Breakfast Nook Dining Set

402

★★★★★ 4.7  583 Reviews

908

2022 OCT 3
I'm not sure if we need it to be a corner one though ?  — 910

*Your quick takes:*

904

906

I actually love this, but in the cherry color

902

Share ↑  — 912

MACHINE LEARNING COLLABORATION TECHNIQUES

TECHNICAL FIELD

This disclosure generally relates to online collaboration. More specifically, but not by way of limitation, this disclosure relates to using machine learning to organize and generate collaborative recommendations.

BACKGROUND

Online interaction with items, such as evaluating different items to select for download or purchase, is increasingly popular. For example, users can maintain online lists of articles to read, wish list items to purchase, and so forth. Limited means exist for allowing users to collaborate regarding such items. For example, different users can comment on an article and discuss the article with one another. As another example, shared shopping carts can be used to allow different users to add goods to an online shopping cart. Such collaboration often requires users to manually solicit and gather feedback from other users.

SUMMARY

The present disclosure describes techniques for using machine learning to organize and generate collaborative recommendations.

In some embodiments, a computing system facilitates collaboration between users to evaluate different items available online. The computing system gathers and solicits feedback from different users, or collaborators, and analyzes the feedback to organize the items and provide recommendations.

User interfaces are provided to display items and item information and solicit and gather user commentary on the items. The user interfaces may include text entry fields into which a user can enter commentary. The user interfaces may further include interface elements that a user can interact with to solicit commentary from other users. The feedback from the different users is stored in association with item information.

Multiple machine learning models are used to analyze and distill the user commentary, along with historical user actions associated with the items. A sentiment analysis machine learning model can analyze provided text commentary to discern a sentiment (e.g., whether a particular user likes, dislikes, loves, hates, or recommends a particular item). This sentiment can then be analyzed by one or more additional machine learning models to provide recommendations for other items. For example, a recommendation machine learning model takes as input user sentiments associated with an item and user activities associated with the item. As a specific example, item A was purchased by user 1 after user 2 recommended item A. Item B was saved by user 1 after user 3 recommended item B. Based on such input, the recommendation machine learning model identifies another item to recommend to user 1. The computing system provides the recommendation to the user. The computing system may further display the collaboration instance so that the user can view and evaluate the different feedback on a target item from the different users. These techniques make the collaboration process user-friendly and efficient, and leverage multiple machine learning models to make useful predictions and recommendations.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 2 depicts an example of a flow for online collaboration, according to certain embodiments of the present disclosure.

DETAILED DESCRIPTION

Figure 1:
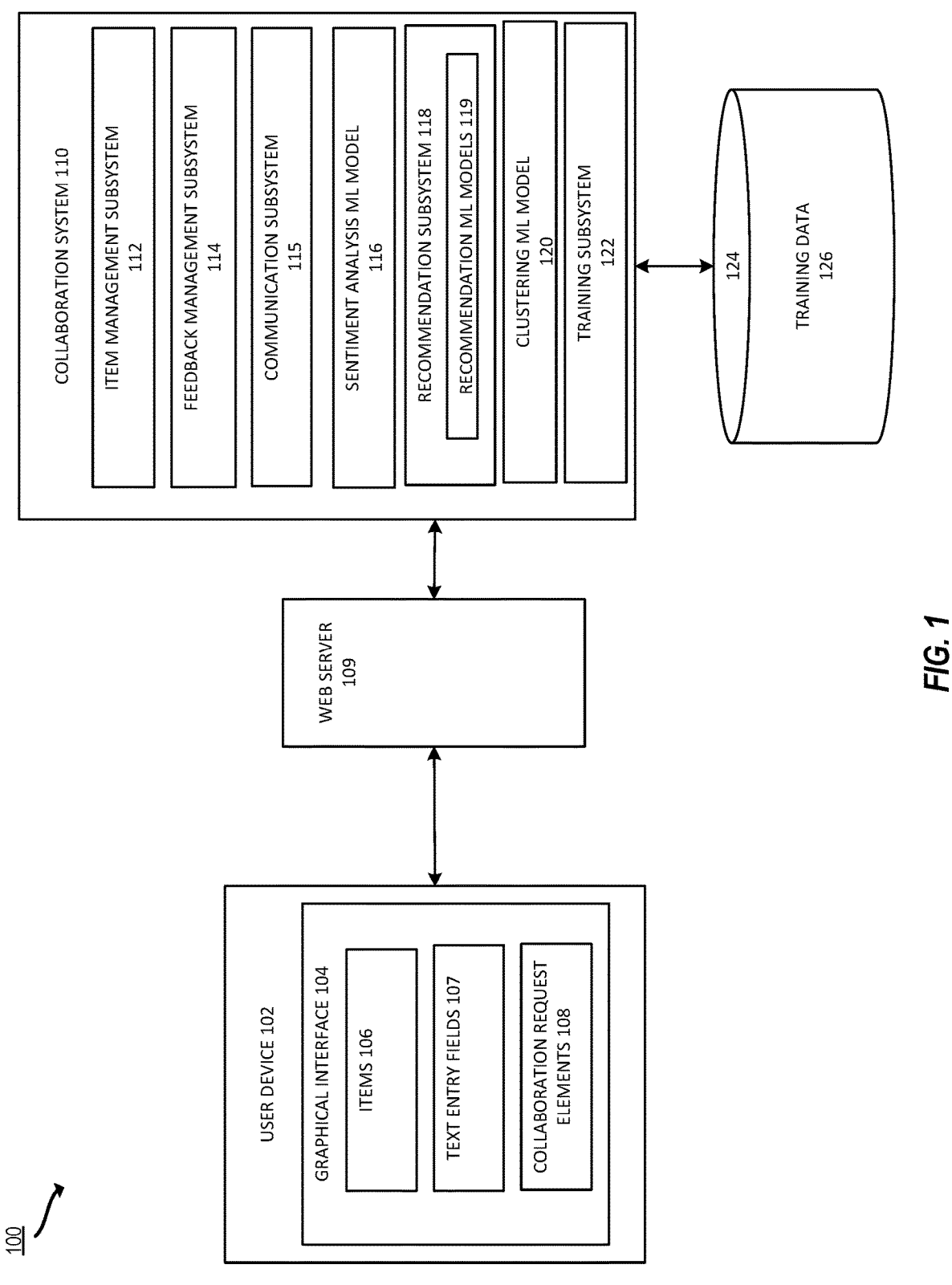
FIG. 1 depicts an example of a computing system for online collaboration, according to certain embodiments of the present disclosure.

In the following description, for the purposes of explanation, specific details are set forth in order to provide a thorough understanding of certain inventive embodiments. However, it will be apparent that various embodiments may be practiced without these specific details. The figures and description are not intended to be restrictive. The word "example" is used herein to mean "serving as an example, instance, or illustration." Any embodiment or design described herein as "an example" is not necessarily to be construed as preferred or advantageous over other embodiments or designs. Various embodiments are described herein, including methods, systems, non-transitory computer-readable storage media storing programs, code, or instructions executable by one or more processors, and the like.

The present disclosure describes techniques for facilitating collaboration between users leveraging multiple machine learning models. A collaboration system manages and analyzes feedback and actions of different users with respect to an item for collaboration. A first user performs online interactions with respect to an item. For example, the first user may be a researcher selecting an appropriate article or a shopper selecting goods to purchase. The first user selects an item for collaboration. The collaboration process includes gathering feedback from multiple users regarding the item. For example, the first user and one or more other collaborators provide opinions, questions, answers, and so forth, to help decide whether to select the item. In the example of a researcher, the first user may solicit feedback from colleagues as to whether a particular article is on-point. In the example of a shopper, the first user may solicit feedback from family members as to whether a piece of furniture will be a good fit for their home.

The first user provides first text with commentary on an item. The first user may interact with a text entry field of a user interface to add opinions, questions, or comments to initiate collaboration. For example, the first text could be "Do you think this car would work for us?" or "This article looks good but I'm not familiar with the author. What do you think?". The first user can then solicit commentary on the item from one or more other users. The user interface may provide interface elements for initiating contact with other users. Upon detecting user selection of such an interface element, the collaboration system contacts the second user requesting commentary on the item. The second user then provides commentary on the item in second text. The second text may answer any questions posed by the first user, add opinions about the item, questions from the second user, and so forth. This may be repeated for additional collaborators.

The collaboration system uses a first machine learning model to perform sentiment analysis on the first text, second text, and any other provided text commentary on the item. The first machine learning model uses natural language processing techniques to identify whether each text commentary is positive, negative, very positive, a question, and so forth, to ascertain a high-level characterization of the text commentary.

The collaboration system uses a second machine learning model to identify a second item for recommendation. The second machine learning model processes input including prior actions of the first user and associated sentiments of the first user. For example, the actions could include downloading an article, citing an article, buying something, adding something to a shopping cart, saving something to a wish list, and so forth. Each such action may be associated with a particular sentiment associated with a particular text commentary provided by the second user—e.g., whether the second user recommends or disparages a particular item. This information is processed by the second machine learning model to determine whether the second user is a trusted advisor—e.g., how strongly the second user's opinion affects the prior actions of the first user. Based on such a trust level, another user's opinions may be weighted more or less heavily in identifying the item for recommendation. The recommendation subsystem provides, to the first user, output recommending the second item.

The techniques described herein solve problems in the field of online interaction between users. Traditionally, soliciting opinions from others online may involve reaching out to different users via email, chat, text, telephone, etc., which results in disjointed feedback in different places that the primary user must organize and keep track of. The user could opt to screenshot the item, share links to the item, or document a list of potential candidates in a centralized location for all participants, none of these being ideal or dynamic. A user could also share account login information with other users from whom feedback is desired, an act which could infringe on user privacy and increases the potential for security breaches.

Another user, or a multitude of users, may be impacted by the selection of an item by a primary user who is in the item consideration phase. As such, a selection made by the primary user that does not meet the requirements of collaborators could lead to wasted time and computing resources if the item will not work out. This could include finding a replacement item, returning an unsatisfactory item, and so forth. If the primary user had been able to easily obtain feedback on the items being considered before selecting an item, the likelihood of selecting the wrong item would have been greatly reduced.

Multiple machine learning models are leveraged to distill the feedback from the various users. Traditionally, it would be a time-consuming manual process to gather, characterize, and draw conclusions from feedback from various users. Using a first machine learning model to perform natural language processing and determine sentiments of text input, and a second machine learning model to identify recommendations based on such sentiments in correlation with actions with respect to items, the collaboration system distills information about the different collaborators' interactions with items over time to automatically recommend other items. By accurately recommending items, the process can spare time, computing resources, and user effort by obviating the need to manually gather and analyze information from disparate sources and computing devices.

Terms

An "item" is an individual article or unit, which may be part of a set of items. An item may be part of an online set of items such as files available for download or goods available for purchase.

A "collaborator" is a person who cooperates with others on an activity or project. For example, a set of users that confer about an item are collaborators. The collaborators may each provide feedback, questions, and other commentary about items. One user may solicit such feedback from one or more other users.

A "sentiment" is a feeling, attitude, or opinion about something. For example, a sentiment associated with an item may be like, dislike, neutral, love, or hate. A sentiment may be associated with text commentary provided by a particular user. In some instances, a sentiment may further indicate whether the text commentary is in the form of a question, answer, general opinion, or the like.

A "collaboration instance" is a data structure that maps one or more items with comments, sentiments, and actions of multiple users. Different collaboration instances may be established for different categories of items. For example, a particular user may have a collaboration instance for articles about an upcoming election and another collaboration instance for articles about an ongoing war. As another example, a user may have one collaboration instance for tables they are considering purchasing and another collaboration instance for sofas they are considering purchasing. In the latter case, the collaboration instance may store images and descriptions of the various sofas, along with text commentary on the different sofas from multiple users and associated sentiments.

A "channel" is a medium for transmitting information (e.g., over a network between computing devices). Examples of such channels include email, short message service (SMS), social media, voice, text, and so forth.

Example of an Operating Environment for Collaboration Management

FIG. 1 depicts an example of a computing environment 100 in which machine learning models are applied to online content to facilitate collaboration between users. In the example depicted in FIG. 1, a user device 102 receives and transmits information to a collaboration system 110 via a web server 109. The collaboration system 110 evaluates the information to facilitate user collaboration with respect to items using an item management subsystem 112, feedback management subsystem 114, communication subsystem 115, sentiment analysis machine learning (ML) model 116, recommendation subsystem 118 including one or more recommendation ML models 119, and clustering ML model 120. The subsystems include a set of trained machine learning models which are trained using a training subsystem 122 using training data 126.

The various subsystems of the collaboration system 110 can be implemented in the same computing system or different, independently operated computing systems. For example, the training subsystem 122 could be a separate entity from the item management subsystem 112, feedback management subsystem 114, communication subsystem 115, sentiment analysis machine learning (ML) model 116, recommendation subsystem 118 including one or more recommendation ML models 119, and clustering ML model 120, or the same entity. Different, independently operating web servers 109 can communicate with the collaboration system 110, or the collaboration system 110 can be part of the same online service as the web server 109. While the system of FIG. 1 can be used, other embodiments can involve the collaboration system 110 being built into a software application executed on the user device 102, e.g., as a plug-in.

Some embodiments of the computing environment 100 include a user device 102. Examples of a user device include, but are not limited to, a personal computer, a tablet computer, a desktop computer, a processing unit, any combination of these devices, or any other suitable device having one or more processors. A user of the user device 102 interacts with a graphical interface 104 by exchanging data with web server 109 and collaboration system 110 via a data network.

The user device is communicatively coupled to the web server 109 and the collaboration system 110 via the data network. Examples of the data network include, but are not limited to, internet, local area network ("LAN"), wireless area network, wired area network, wide area network, and the like.

The graphical interface 104 is an interface such as a Graphical User Interface (GUI) that is capable of displaying and receiving information. In some embodiments, the graphical interface 104 includes items 106 and text entry fields 107. The graphical interface 104 can display various items 106 for consideration and collaboration. This can include an image of an item 106, a name of an item 106, the item 106 itself, in the case of digital content such as images, articles, etc., and/or supplementary information about the item 106 such as description, price, author or manufacturer, and so forth. The text entry fields 107 are interface elements configured to accept and retrieve user-provided text (e.g., characterizing or asking questions about an item).

The graphical interface 104 is further configured to display collaboration request elements 108. The collaboration request elements 108 can include buttons or other interface elements to use to send a collaboration request to a user. For example, a collaboration request element 108 is a button that, when selected, causes the collaboration system to prepare an email to send to a user asking for feedback on an item, which may include a link to and/or image of the item and other useful information. In some aspects, multiple collaboration request elements 108 are displayed corresponding to different channels for contacting a user such as email, short message service (SMS), a social media platform, etc.

In some embodiments, the web server 109 is associated with an entity such as an online merchant, social network, or various different websites that allow users to interact with items. The web server 109 includes functionality to serve a website and accept input for modifying the website from the user device 102 and/or collaboration system 110. In some implementations, the web server 109 is a separate entity and separate computing device from collaboration system 110. Alternatively, in some implementations, the web server 109 is a component of the collaboration system 110.

The collaboration system 110 tracks one or more items and gathers and analyzes associated user feedback and actions. In some embodiments, another item is recommended by updating the graphical interface 104. The collaboration system 110 includes an item management subsystem 112, feedback management subsystem 114, communication subsystem 115, sentiment analysis machine learning (ML) model 116, recommendation subsystem 118, recommendation ML models 119, and clustering ML model 120. The subsystems include trained machine learning models which are trained using a training subsystem 122 using training data 126. In some implementations, the collaboration system 110 further includes, or is communicatively coupled to, one or more data storage units 124 for storing training data 126.

The item management subsystem 112 includes hardware and/or software configured to organize and gather data with respect to one or more items. In some cases, the item management subsystem 112 identifies and provides items for display to users. The item management subsystem 112 may further retrieve and process selection of items to display in further detail and/or collaborate on. The item management subsystem 112 may generate and manage one or more collaboration instances that correlate one or more items with comments, sentiments, and actions of multiple users.

The feedback management subsystem 114 includes hardware and/or software configured to solicit, gather, and store user comments and sentiments associated with items. For example, the feedback management subsystem includes functionality to receive text from users via interface elements (e.g., text including commentary on an item). The feedback management subsystem 114 further includes functionality to receive instructions to request commentary on the item from a user. The feedback management subsystem may provide interface elements (e.g., buttons for contacting a user via a selected channel) to allow the first user to contact other users.

The communication subsystem 115 includes hardware and/or software configured to manage communications to and from users. The communication subsystem 115 may include functionality to generate and send requests for user feedback. This may include identifying user contact information, preparing messages, and transmitting the messages according to the identified user contact information.

The sentiment analysis machine learning (ML) model 116 includes hardware and/or software configured to identify a sentiment associated with text. The sentiment analysis ML model 116 is configured to apply natural language processing (NLP) techniques to identify such a sentiment. For example, the sentiment analysis ML model may determine whether text indicates a feeling such as like, dislike, love, etc.

The recommendation subsystem 118 includes hardware and/or software configured to generate recommendations for items using one or more recommendation ML models 119. The recommendation subsystem 118 includes functionality to gather input data for the respective recommendation ML models 119 and provide such input to the respective ML models 119. The recommendation subsystem 118 further includes functionality to identify and provide recommendations as output by the recommendation ML models 119.

The recommendation ML models 119 are machine learning models configured to generate recommendations based on user feedback and behaviors. In some aspects, multiple recommendation ML models 119 are provided. One recommendation ML model 119 may be configured to recommend an item based on input of behavior of a user (e.g., items selected over time) and associated sentiments of other users (e.g., whether the other users recommended the item). This recommendation ML model 119 may weight feedback from different users based on how each user's feedback correlates with past actions taken (e.g., trusted advisors' opinions are weighted more heavily). Another recommendation model 119 may be configured to recommend an item that a particular user would recommend, based on input of behavior and feedback provided by that user specifically. In some aspects, one or both of the recommendation ML models 119 are neural networks. Alternatively, or additionally, other types of models, such as a logistic regression model or a decision tree, are implemented. Additional types of models that may be implemented include collaborative filtering, content based filtering, or hybrid filtering. Such models can be applied based on a combination of user behavior and feedback with item-related decisions. The item-related decisions, behavior, and feedback of similar users (e.g., from a same or similar segment or class) can also be used to generate recommendations using a filtering model.

The clustering ML model 120 includes hardware and/or software configured to group similar items together. The clustering ML model may apply suitable clustering techniques to a set of items to group the related items together based on input data such as item images/appearance, item description, item price, item category, item author or manufacturer, and so forth.

The training subsystem 122 includes hardware and/or software configured to train one or more of the machine learning models 116, 119, 120. The training subsystem 122 includes functionality to gather appropriate training data 126, which may be labeled and/or unlabeled. The training subsystem 122 includes functionality to provide the appropriate training data to the corresponding machine learning model. The training subsystem 122 includes functionality to obtain output from the machine learning models. The training subsystem 122 includes functionality to compare the output to the training data, and update parameters of the machine learning models based on the comparison.

In some examples, the recommendation ML models 119 are neural networks. The training subsystem trains the recommendation ML models 119 using backpropagation. For example, a neural network receives training data as input and outputs a predicted result. This result is compared to the label assigned to that training data. In some implementations, the comparison is performed by determining gradients based on the input and predicted result (e.g., by minimizing a loss function by computing and minimizing a loss value representing an error between the predicted result and the actual label value). The computed gradient is then used to update parameters of the neural network.

The data storage unit 124 can be implemented as one or more databases or one or more data servers. The data storage unit 124 includes training data 126 that is used by the training subsystem 122 and other engines of the collaboration system 110.

Examples of Operations for Facilitating User Collaboration for Item Recommendation FIG. 2 depicts an example of a flow 200 for facilitating user collaboration for item recommendation, according to certain embodiments. The operations described with respect to FIG. 2 may be executed by the components depicted in FIG. 1.

Prior to the processing of the flow 200, the collaboration system may display various items, one or more of which are selected by a user for collaboration. In some examples, the items are pieces of clip art used by graphic designers to collaborate and select for a project. As another example, the items are goods available for purchase that a prospective buyer wants feedback from others on. In some aspects, the various items are displayed via different user interface views of a particular website. For example, the website may be an image hosting website managing items in the form of images available for download. As another example, the website may be a shopping website managing items in the form of goods available for purchase from a merchant. As another example, the website may be a on online journal hosting items in the form of articles available for download. A first, primary user may log in to the website to access collaboration functionality which can be tracked and stored for the user over time. This can include establishing one or more collaboration instances, where items and associated comments and sentiments are stored and tracked according to feedback from multiple users/collaborators.

Figure 3:
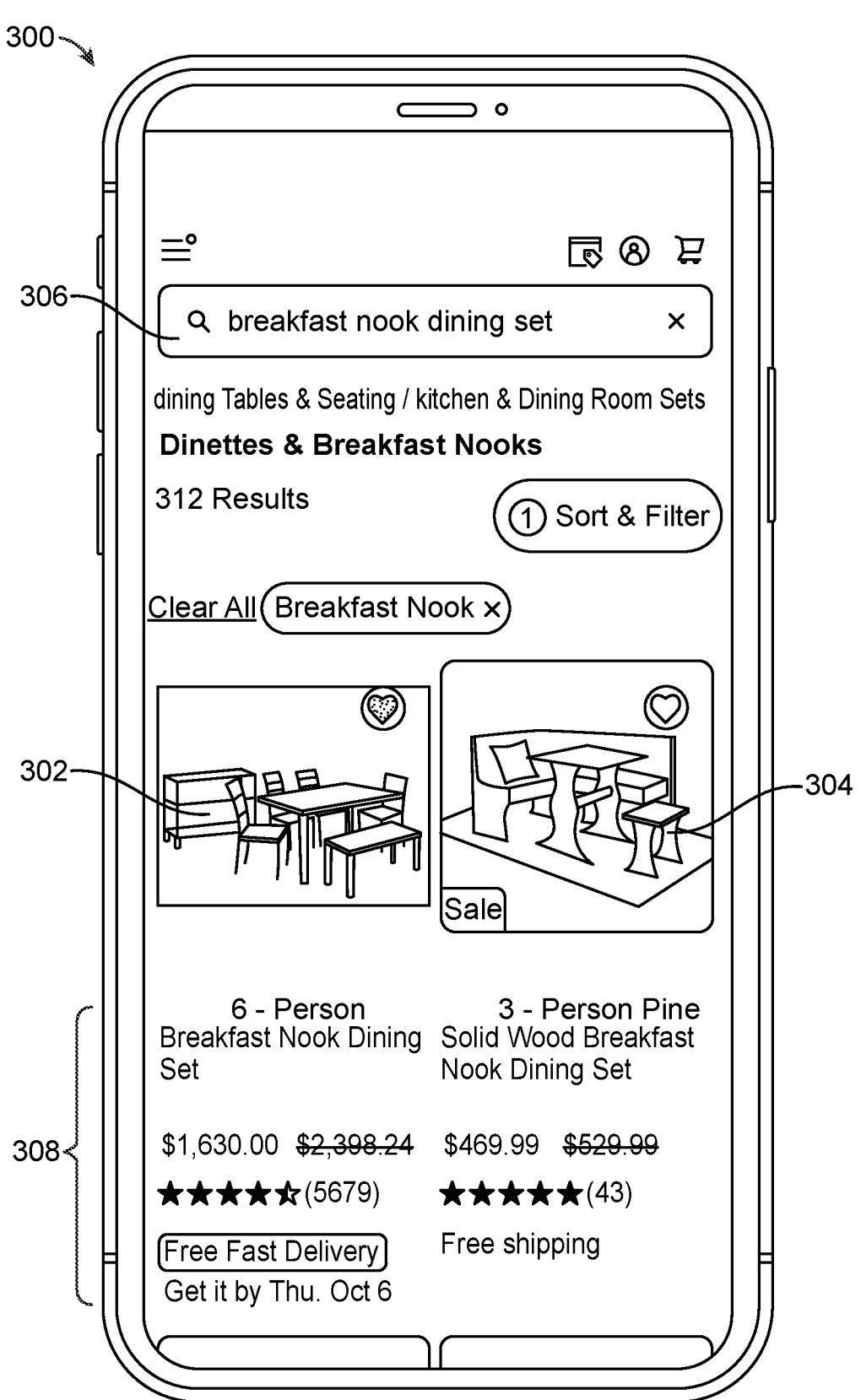
FIG. 3 depicts an example interface for displaying items, according to certain embodiments of the present disclosure.

In some examples, the item management subsystem displays, to a first user, a plurality of items. Displaying the items to the first user may include transmitting data to a user device associated with the first user, causing the user device to display the items. FIG. 3 shows an example of a user interface displaying a plurality of items, in which multiple breakfast nooks available for purchase are displayed. The item management subsystem receives, from the user, selection of a particular item. For example, the user clicks on one of the breakfast nooks shown in FIG. 3, causing transition to the user interface shown in FIG. 4 featuring the selected item in more detail.

In some aspects, the selected item is added to a collaboration instance prior to the processing of the flow 200. The collaboration instance links one or more items to feedback from multiple users. The item may be added to a new or existing collaboration instance based on a category of the item. In some examples, the user manually selects a collaboration instance. In other examples, the collaboration system applies machine learning to identify an appropriate collaboration instance for the item, as further described below. In some aspects, the collaboration instances manage collaboration information at the item level, storing the information in association with a particular item (e.g., rather than in a shopping cart or other aggregated data structure).

At step 202, a feedback management subsystem receives first text from a first user. The first text includes commentary on an item. For example, the item is something that the first user is considering purchasing. In some instances, the feedback management subsystem displays, to the first user, a first interface element (e.g., a text entry field) for accepting text data. The feedback management subsystem may display interface elements such as those depicted in FIG. 6 to allow the user to enter the first text into the first interface element. In the example shown in FIG. 6, the entered text states "I'm not sure if we need it to be a corner one though?".

At step 204, the feedback management subsystem receives instructions from the first user to request commentary on the item from a second user. The feedback management subsystem may provide interface elements to allow the first user to contact other users. For example, the feedback management subsystem displays, to the first user, a second interface element for contacting another user. The instructions to contact the second user are received via the second interface element. As a specific example, the user interface 700 depicted in FIG. 7 includes an invite collaborators button 704. Upon detecting user selection of the invite collaborators button 704, the interface 700 transitions to include interface elements for the first user to provide contact information for the second user.

In some embodiments, the feedback management subsystem receives input from the first user identifying a channel for contacting the second user. For example, selectable channels may include one or more social media platforms, email, text, and/or the like. The first user may provide input to use different channels to contact different users. For example, the feedback management subsystem receives input from the first user identifying a first channel for contacting the second user and a second channel for contacting a third user. The notifications are transmitted to the second user and the third user via the selected channels. As a specific example, the first channel is a social media platform, and the second channel is email or text. In some aspects, the feedback management subsystem displays buttons for selecting the desired channel(s), such as the buttons 802-808 illustrated in FIG. 8.

At step 206, responsive to receiving the instructions to request commentary from the second user, a communication subsystem transmits a notification to the second user. For example, the communication subsystem prepares a notification in the form of a message to the second user such as "What do you think of this car?". The notification may further include a link to the website and/or images and text characterizing the item. The communication subsystem identifies the provided contact information for the second user and uses the contact information to transmit the notification to the second user. The notification is then received by a user device associated with the second user, e.g., via communication over a network.

Upon receiving the notification, the second user selects the link to the website or otherwise navigates to the website. The website displays the item (e.g., via a user interface such as that depicted in FIG. 4). The website may then present a user interface such as that depicted in FIG. 9 for accepting input from the second user. The user interface may be displayed on the user device associated with the second user.

At step 208, the feedback management subsystem receives, from the second user, second text comprising commentary on the item. Receiving the second text may be performed in a similar fashion to receiving the first text at step 202.

Figure 9:
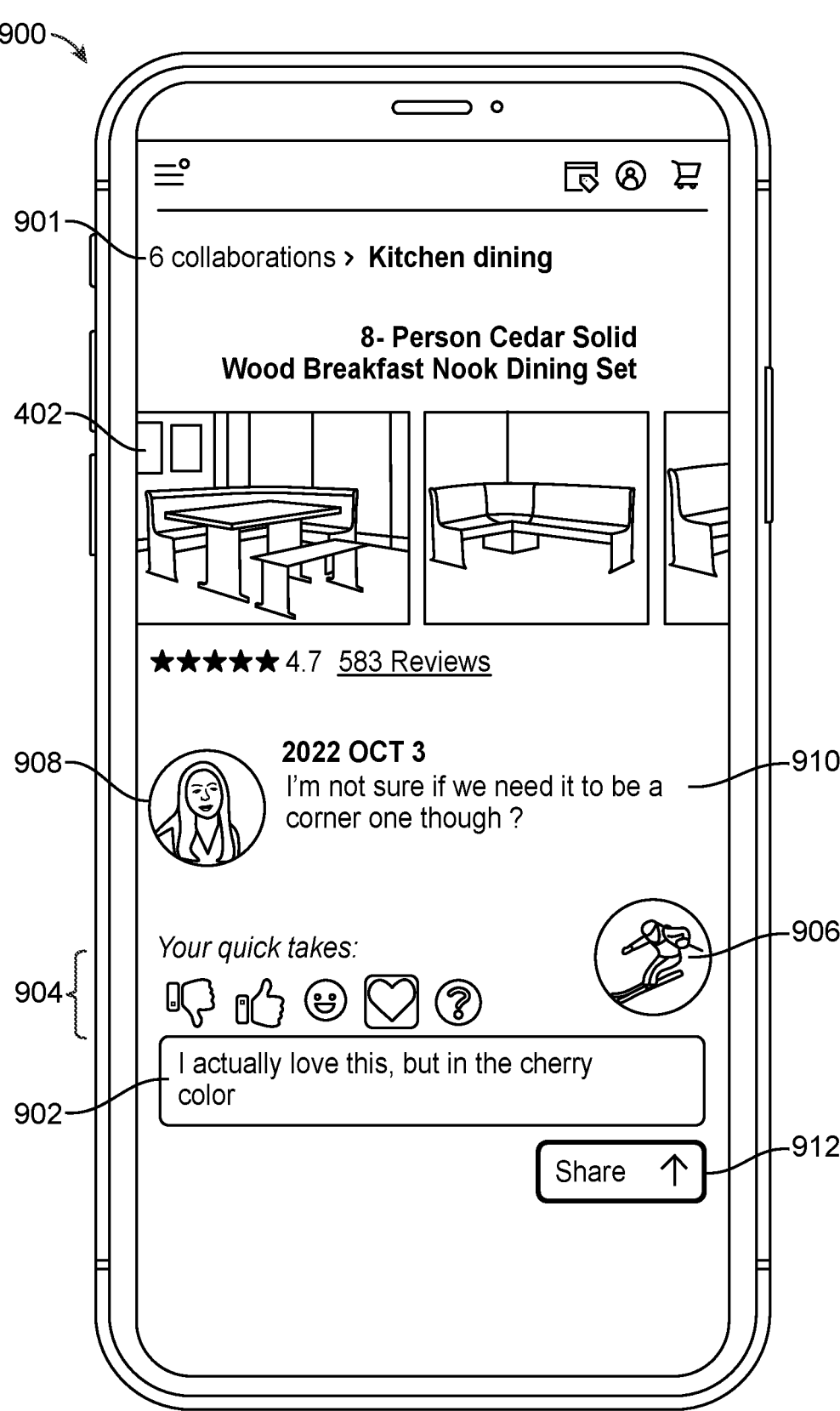
FIG. 9 depicts an example interface for accepting input from a collaborator, according to certain embodiments of the present disclosure.

In some examples, the item management subsystem displays, via a graphical user interface, the item, the first text and the second text. For example, as shown in FIG. 9, an example user interface incudes the name and image of the first item, and text provided by different users with their respective names and avatars. This interface conveniently provides information from different collaborators in one place.

At step 210, a first machine learning model (e.g., the sentiment analysis ML model 116 shown in FIG. 1) performs sentiment analysis to identify a sentiment of the first text and a sentiment of the second text. The first machine learning model may use NLP techniques to identify respective sentiments of the first text and second text. This may involve analyzing the text to determine an emotional tone of the text, such as positive, negative, or neutral. The first machine learning model may analyze words in the text and the meaning of those words together to identify the sentiments. In some aspects, the sentiment analysis ML model further determines whether the text is a question, answer, opinion, or the like.

At step 212, a recommendation subsystem identifies one or more prior actions of the first user and one or more associated sentiments of the second user. The prior actions may be associated with other items. The prior actions include adding an item to a shopping cart, buying the item, not buying the item, removing the item from the shopping cart, selecting the item, saving the item, and so forth. When the user performs such actions, the collaboration subsystem may store an indication of the actions. The recommendation subsystem may subsequently retrieve the stored prior actions of the first user in association with the other items. For some or all of these other items, the second user may have previously provided some text feedback and/or emojis. The first machine learning model may have previously analyzed such feedback to determine one or more associated sentiments. Those sentiments may have been stored by the system. The recommendation subsystem retrieves such stored sentiments.

At step 214, a second machine learning model identifies a second item based on the one or more prior actions of the first user and the one or more sentiments of the second user. The second machine learning model may be one of the recommendation ML models 119. The second machine learning model may process input indicating actions of the first user over time such as buying or otherwise selecting an item, adding the item to a wish list or cart, or not doing so. The second machine learning model is further configured to process input indicating sentiments of the second user that are associated with the actions of the first user. For example, such input may indicate that the second user recommended an item that the first user selected, the second user recommended an item that the first user did not select, the second user disliked an item that the first user selected, and so forth. The second machine learning model processes the input to generate a recommendation, which is based on prior item interactions and commentary.

In some aspects, the collaboration system solicits and gathers information from one or more additional users as described above with respect to steps 204-214. For example, the feedback management subsystem receives, from the first user, instructions to request commentary on the item from a third user. Responsive to receiving the instructions to request commentary from the third user, the communication subsystem transmits a notification to the third user. The feedback management subsystem receives, from the third user, third text comprising commentary on the item. The first machine learning model performs sentiment analysis to identify a sentiment of the third text. The recommendation subsystem identifies one or more sentiments of the third user associated with the one or more prior actions of the first user. The second machine learning model further identifies the second item based on the one or more sentiments of the third user.

When identifying the second item based on sentiments of multiple users, the collaboration system may assign weights to the sentiments associated with the respective users, based on a correlation between prior actions of the first user and sentiments of the respective other users. These weights are learned from behavioral data over time. The prior actions of the first user can include agreeing or disagreeing with the second user's assessment of an item, as well as actions such as buying or not buying the item, saving or not saving the item to a wish list, and the like. The second machine learning model learns weights that it assigns to the various collaborators as feedback from each collaborator may not be equally influential to the first user. For example, if the first user always purchases items that his wife loves, and occasionally purchases items that his brother loves, then the feedback from the wife is weighted more heavily than the feedback from the brother. In other words, the one or more sentiments of the second user are assigned a first weight based on a correlation between the one or more prior actions of the first user and the one or more sentiments of the second user. The one or more sentiments of the third user are assigned a second weight based on a correlation between the one or more prior actions of the first user and the one or more sentiments of the second user. The second machine learning model applies the first weight and the second weight in identifying the second item.

At step 216, the recommendation subsystem provides, to the first user, output recommending the second item. For example, the recommendation displays text such as "We recommend," "recommended items," or the like, along with text and/or images of the second item. The output may be provided via a user interface of the website for display on the user device associated with the first user.

In some aspects, the recommendation subsystem uses a third machine learning model (e.g., one of the recommendation ML models 119 shown in FIG. 1) to identify an item that the second user would be likely to recommend. While the item recommended at steps 214-216 is based on general feedback (e.g., the recommendation may be based on feedback and behavior of the first user as well as recommendations by the second user and any other collaborators such as a third user, fourth user, etc.), the recommendation generated by the third machine learning model is specific to what the second user would recommend. Based on the one or more sentiments of the second user and respective items associated with the one or more sentiments of the second user, the recommendation subsystem uses a third machine learning model to identify a third item that the second user would be likely to recommend. In some instances, the identification of the third item that the second user would be likely to recommend is further based on the second user's prior interactions with items. For example, if the second user has an account with the website, the account information can be retrieved to identify items that the second user has purchased, viewed, added to a cart, etc. It should be noted, however, that the second user need not have an account with the website to be a collaborator, and collaborators such as the second user, third user, etc. can participate in the collaboration process without the friction of logging into an account.

The third machine learning model may, for example, be a neural network that has been trained to process input including prior recommendations for and/or interactions of a user with items, and output one or more other items that the user is likely to recommend.

The recommendation subsystem may then display to the first user an indication that the second user would be likely to recommend the third item. For example, the recommendation subsystem displays text such as "Jenny would recommend this dress," image(s) of the third item, and/or an image or avatar of the second user.

In some aspects, the system uses a fourth machine learning model (e.g., the clustering ML model 120 shown in FIG. 1) to group related items together. The fourth machine learning model may apply suitable clustering techniques to a set of items to group the related items together, such as k-means clustering, mean shift clustering, or hierarchical clustering. The items may be clustered together based on input data such as item images/appearance, item description, item price, item category, item author or manufacturer, and so forth.

Based on the grouping of the items generated by the fourth machine learning model, the recommendation subsystem may provide the set of related items to a first user. This can be in the form of a recommendation, such as, if you like this item, you'll like these items. Alternatively, or additionally, the item management subsystem may use the generated clusters to assign items to appropriate collaboration instance. For example, the first user has a collaboration instance for party dresses and a collaboration instance for sun dresses. Based on the cluster assigned to a particular dress that the first user has chosen to collaborate on, the item management subsystem automatically assigns the dress to the party dress collaboration instance. The item management subsystem may also generate new collaboration instances based on the clustering results.

In some aspects, the clustering model groups related items together along with the corresponding information from the collaborators. For example, the clustered items are mapped to comments and/or sentiments from multiple users.

In some examples, the collaboration system generates additional item attribute(s) based on feedback from multiple users. Examples of such item attributes include "collaborator validated," "collaborators like," and "lots of conversations about this item." Extracted comment substrings, snippets, and/or emojis can be attributes as well. These attributes can be added to item data, be searchable and used as facets in search results.

In some aspects, ML is leveraged in building a data set that focuses on products that have involved collaboration. This data can include product details, feedback text, sentiment (from text or emoji), volume of interaction in the collaboration, and the end state of the collaboration (purchase or other states). Training predictive models on this data can help users bring valued and prior collaboration opinions into their decisioning and item selection.

The techniques described herein provide several advantages. As noted above, traditionally, soliciting opinions from others online may involve reaching out to different users via different channels and manually compiling and assessing the feedback. The techniques described herein provide a low-friction interface to contact different users to solicit their feedback, gather the feedback, and organize it into a collaboration instance. Multiple machine learning models are leveraged to draw conclusions such as recommendations based on the feedback and interactions of the various users. By accurately and automatically recommending items using specialized ML models, the techniques described herein can spare time, computing resources, and user effort by obviating the need to manually gather and analyze information from disparate sources and computing devices.

Example Interfaces for Collaboration Management

FIGS. 3-9 illustrate various user interfaces that can be used to facilitate collaboration as described above with respect to FIGS. 1 and 2.

FIG. 3 is an example of a user interface 300 for displaying items. A user can scroll through various different items such as item 302 and item 304. Such items may be displayed according to a category of items, such as a category configured via user input to a search field 306. In this example, a user has searched for breakfast nook dining sets, and several breakfast nooks are displayed via the user interface 300. For each item, the user interface 300 further displays supplemental information 308 such as a name of the item, a price of the item, a rating of the item, and shipping information for the item. Upon detecting user selection of one of the items, the user interface 300 may transition to the user interface 400 of FIG. 4.

Figure 4:
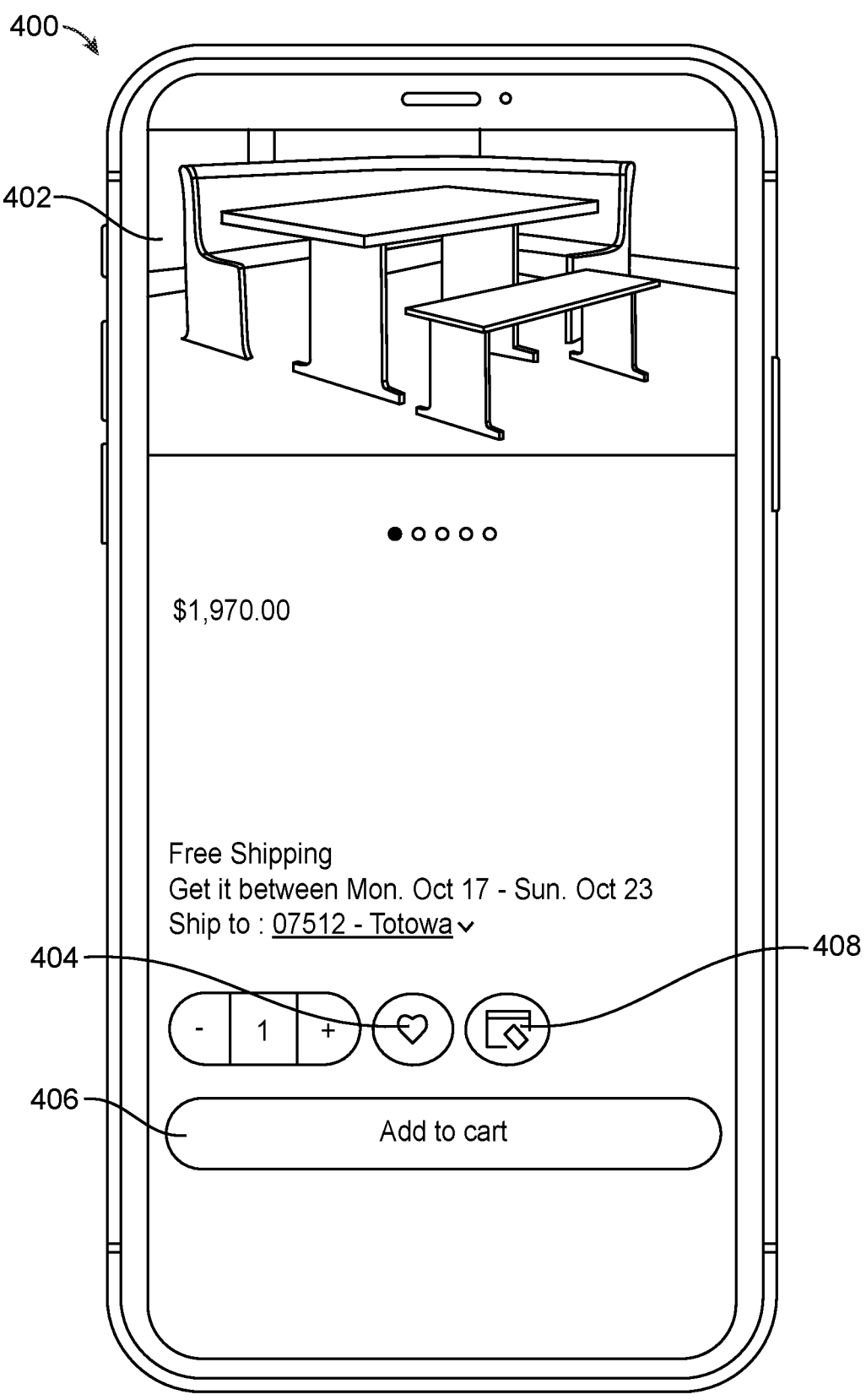
FIG. 4 depicts an example interface for displaying a particular item, according to certain embodiments of the present disclosure.

FIG. 4 is an example of a user interface 400 for displaying a particular item 402. The user interface 400 includes various buttons for different interactions with the item 402. A like button 404 can be used to add the item 402 to a list of liked items. An add to cart button 406 can be used to add the item to a shopping cart. A collaborate button 408 can be used to initiate a collaboration process. Upon detecting user selection of the collaborate button 408, the user interface 400 may transition to the user interface 500 of FIG. 5.

Figure 5:
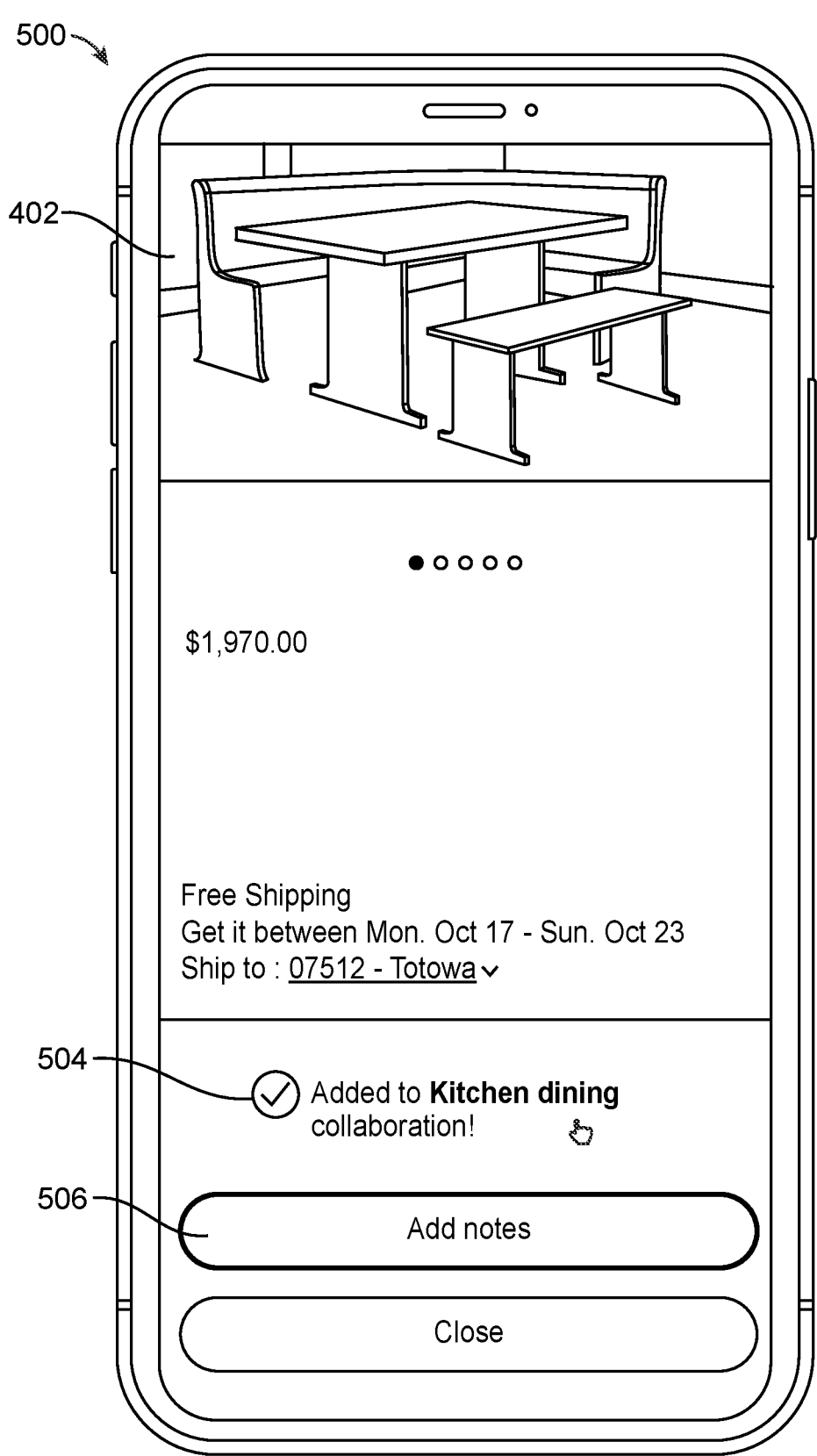
FIG. 5 depicts an example interface for high-level collaboration instance management, according to certain embodiments of the present disclosure.

FIG. 5 is an example of a user interface 500 for high-level collaboration instance management. The user interface 500 continues to display the item 402. The user interface 500 further includes interface elements related to an associated collaboration instance. The user interface 500 includes an indication of the collaboration instance 504—in this example, "Added to kitchen dining collaboration," which indicates that the item 402 has been added to a collaboration instance called kitchen dining. The user interface 500 further includes an add notes button 506. The add notes button can be used to prompt the system to transition to a user interface configured to receive text associated with the item 402. Upon detecting user selection of the add notes button 506, the user interface 500 may transition to the user interface 600 of FIG. 6.

Figure 6:
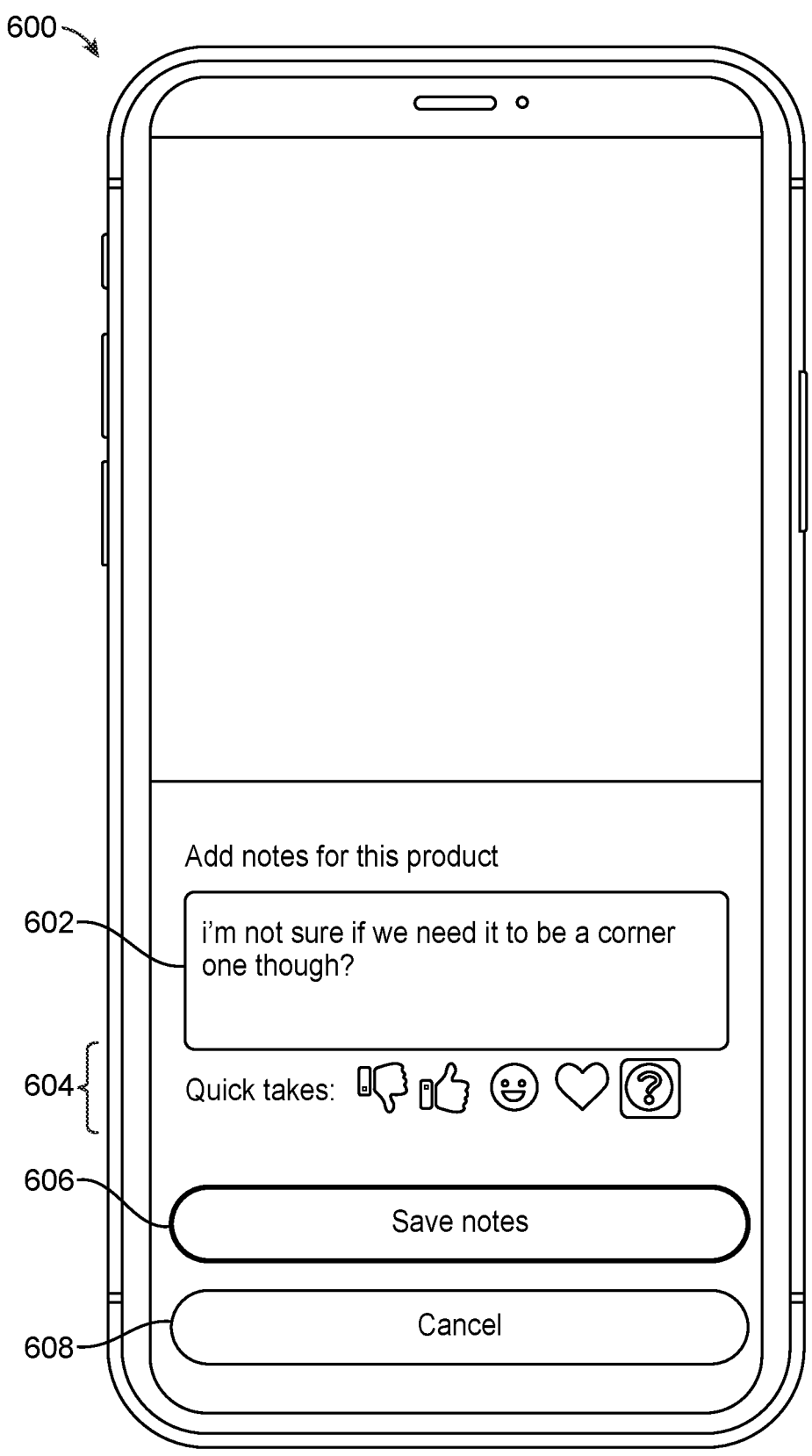
FIG. 6 depicts an example interface for receiving text associated with an item, according to certain embodiments of the present disclosure.

FIG. 6 is an example of a user interface 600 for receiving text associated with an item. The user interface 600 includes a text entry field 602 which a user can interact with to enter text. For instance, a user may provide text via the text entry field 602 that includes commentary on an item, as described at step 202 of FIG. 2. The user interface 600 further includes quick take emojis 604. Alternatively or additionally to entering the text, the user may select an emoji to express their opinion of the item. Alternatively, the sentiment analysis ML model 116 may analyze the inputted text, determine a sentiment associated with the text, and automatically select the corresponding emoji. In this example, since the text includes a question about the item, the corresponding emoji is a question mark. Other emojis shown are a thumbs down, indicating disliking the item, a thumbs up, indicating liking the item, a happy face, indicating happiness associated with the item, and a heart, indicating loving the item. The user interface 600 further includes a save notes button 606 for saving the note entered into the text entry field 602 and a cancel button 608 for canceling input. Upon detecting user selection of the save notes button 606, the user interface 600 may transition to the user interface 700 of FIG. 7.

Figure 7:
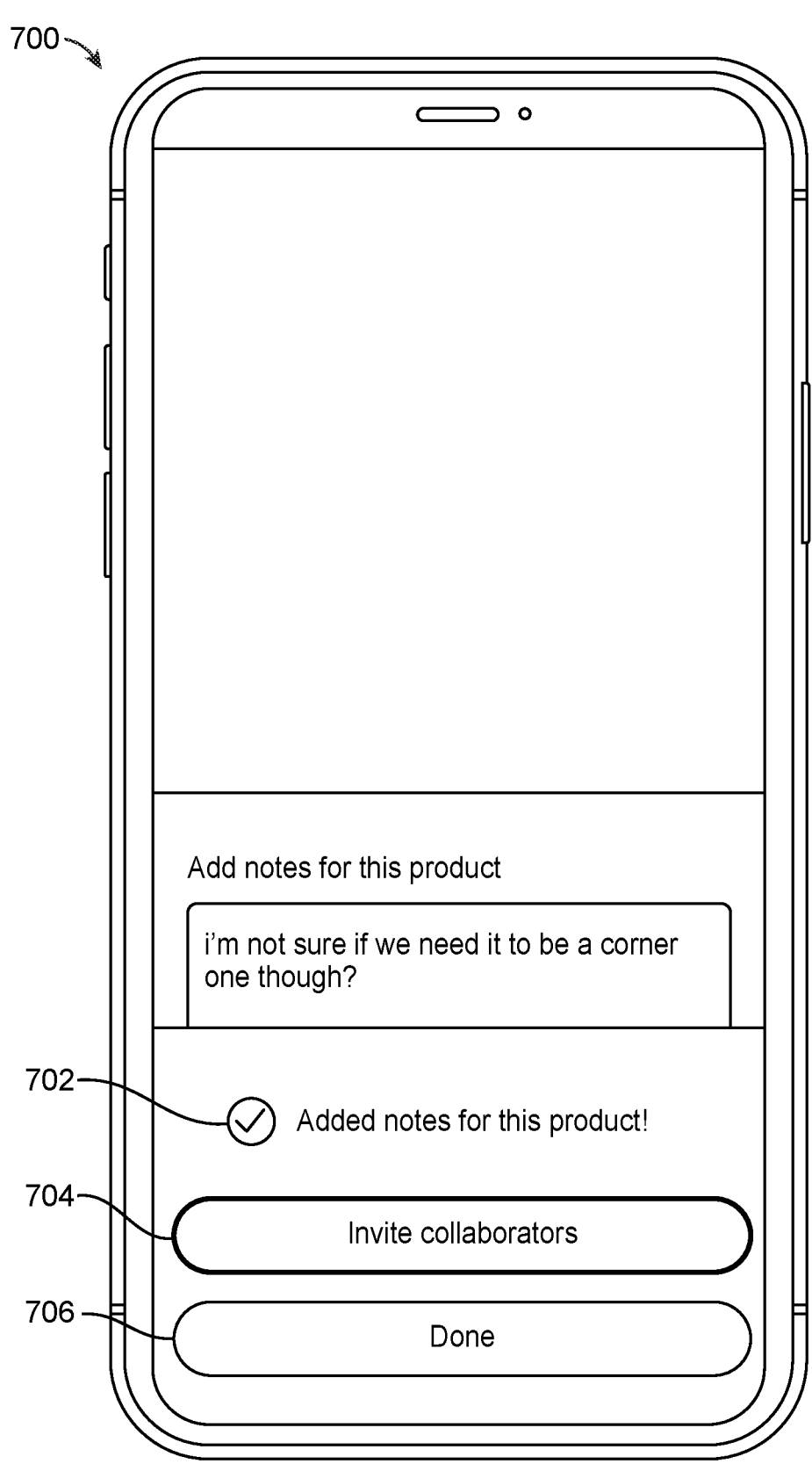
FIG. 7 depicts an example interface for facilitating collaboration associated with an item, according to certain embodiments of the present disclosure.

FIG. 7 is an example of a user interface 700 for facilitating collaboration associated with an item. The user interface 700 includes a notification 702 indicating that notes have been added for the item. The user interface 700 further includes an invite collaborators button 704 for inviting other users to collaborate in association with an item. The user interface 700 further includes a done button 706 which the user can select if they wish to finish after adding notes without inviting collaborators. Upon detecting user selection of the invite collaborators button 704, the user interface 700 may transition to the user interface 800 of FIG. 8.

Figure 8:
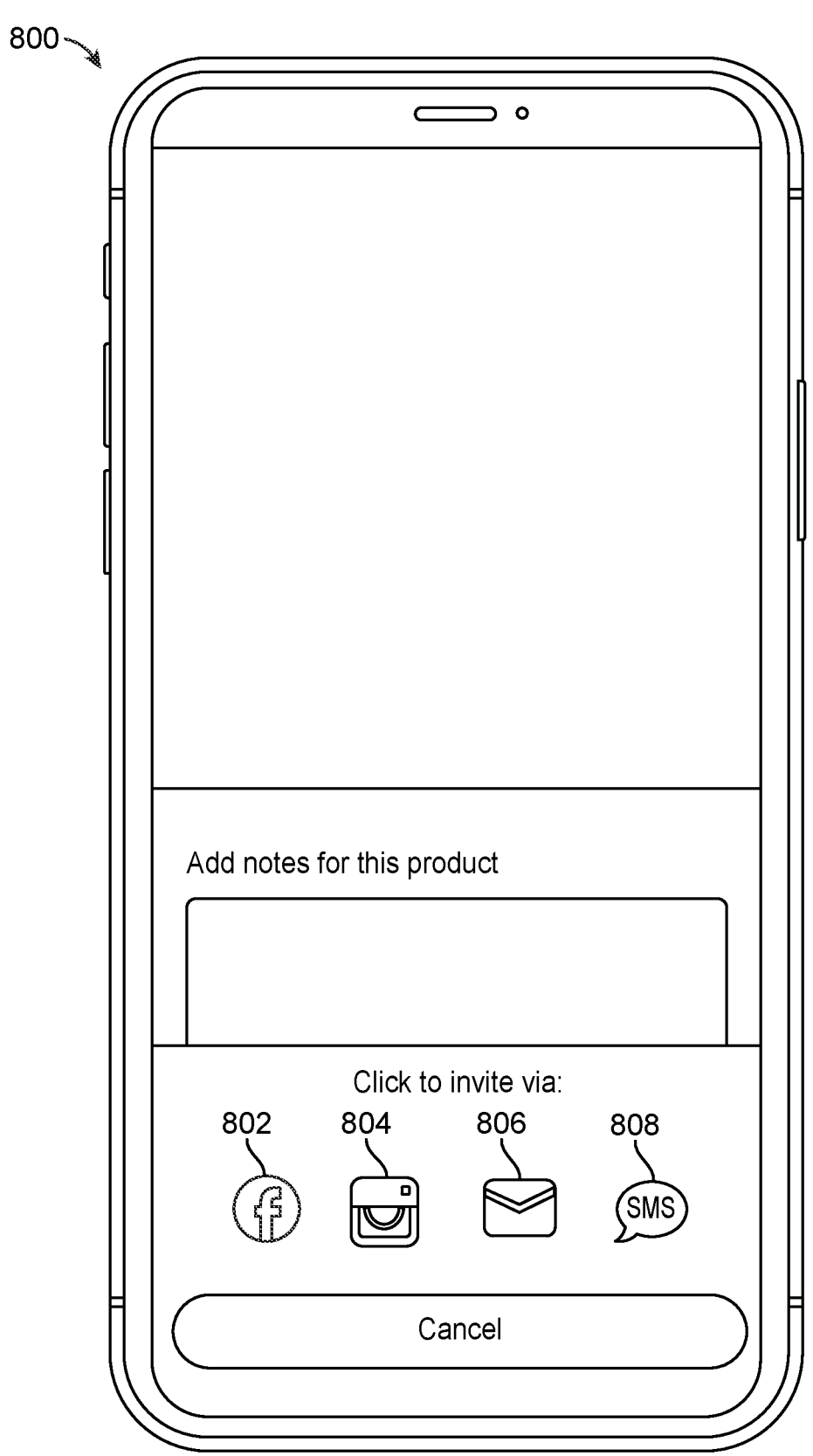
FIG. 8 depicts an example interface for inviting a user to collaborate, according to certain embodiments of the present disclosure.

FIG. 8 is an example of a user interface 800 for inviting a user to collaborate. The user interface 800 includes buttons for inviting a user to collaborate via various channels. A user can select to invite another user to collaborate via a first social media platform via a first button 802. The user can select to invite another user to collaborate via a second social media platform via a second button 804. The user can select to invite another user to collaborate via email via a third button 806. The user can select to invite another user to collaborate via SMS via a fourth button 808. Upon detecting selection of one of the buttons, the computing system may display interface elements for accepting contact information in the selected channel.

FIG. 9 is an example of a user interface 900 for accepting input from a collaborator. The user interface 900 displays the item 402. The user interface 900 includes information about the collaboration instance 901—"Kitchen dining." The user interface 900 further includes a text entry field 902 which a user can interact with to enter text. For instance, a user may provide text via the text entry field 902 that includes a collaborator's commentary on an item, as described at step 208 of FIG. 2. In this example, the collaborator has entered the text, "I actually love this, but in the cherry color." The user interface 900 further includes quick take emojis 904, as described above with respect to FIG. 6. In this example, since text indicates that the collaborator loves the item, the selected emoji is the heart. The interface 900 further displays an image or avatar of the collaborator 906 near their input and an image or avatar of the first user 908 near the first user's comment 910. The interface 900 includes a share button 912, which, when selected, causes the computing system to save the input to the text entry field 902 and provide it to the first user.

Example of a Computing System for Collaboration Management

Figure 10:
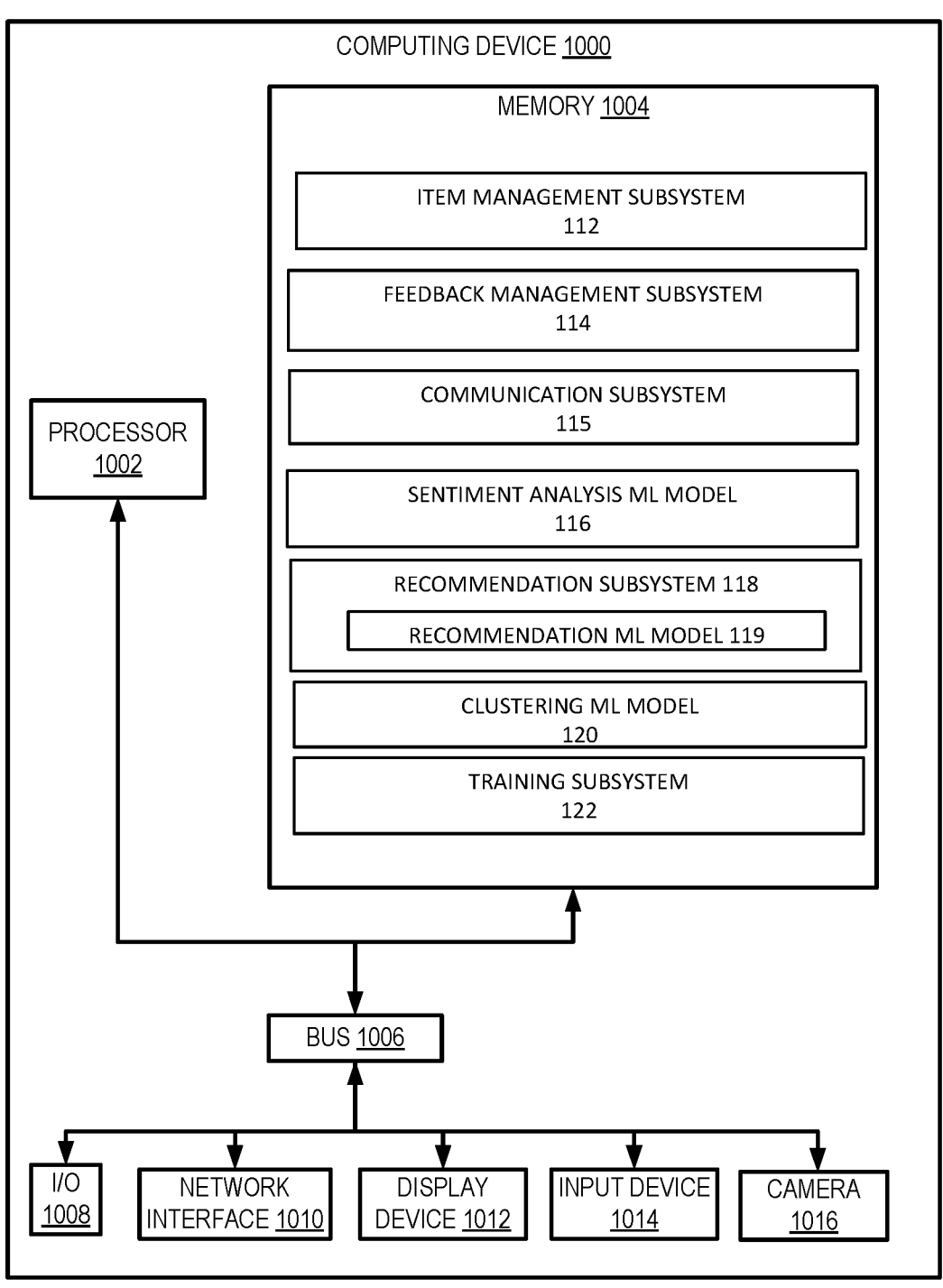
FIG. 10 depicts an example of a computing system that performs certain operations described herein, according to certain embodiments of the present disclosure.

Any suitable computing system or group of computing systems can be used for performing the operations described herein. For example, FIG. 10 depicts examples of a computing device 1000 that executes an item management subsystem 112, feedback management subsystem 114, communication subsystem 115, sentiment analysis machine learning (ML) model 116, recommendation subsystem 118, recommendation ML models 119, clustering ML model 120, and training subsystem 122 (as described above with respect to FIG. 1).

The depicted examples of a computing device 1000 includes a processor 1002 communicatively coupled to one or more memory components 1004. The processor 1002 executes computer-executable program code stored in a memory component 1004, accesses information stored in the memory component 1004, or both. Examples of the processor 1002 include a microprocessor, an application-specific integrated circuit ("ASIC"), a field-programmable gate array ("FPGA"), or any other suitable processing device. The processor 1002 can include any number of processing devices, including a single processing device.

The memory component 1004 includes any suitable non-transitory computer-readable medium for storing data, program code (e.g., executable instructions), or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing device 1000 may also include a number of external or internal devices, such as input or output devices. For example, the computing device 1000 is shown with one or more input/output ("I/O") interfaces 1008. An I/O interface 1008 can receive input from input devices or provide output to output devices. One or more buses 1006 are also included in the computing device 1000. The bus 1006 communicatively couples one or more components of a respective one of the computing device 1000.

The computing device 1000 executes program code that configures the processor 1002 to perform one or more of the operations described herein. The program code may correspond to the item management subsystem 112, feedback management subsystem 114, communication subsystem 115, sentiment analysis machine learning (ML) model 116, recommendation subsystem 118, recommendation ML models 119, clustering ML model 120, training subsystem 122, and/or other suitable applications that perform one or more operations described herein. The program code may be resident in the memory component 1004 or any suitable computer-readable medium and may be executed by the processor 1002 or any other suitable processor. In some embodiments, the item management subsystem 112, feedback management subsystem 114, communication subsystem 115, sentiment analysis machine learning (ML) model 116, recommendation subsystem 118, recommendation ML models 119, clustering ML model 120, and training subsystem 122 are stored in the memory component 1004, as depicted in FIG. 10. In additional or alternative embodiments, one or more of the item management subsystem 112, feedback management subsystem 114, communication subsystem 115, sentiment analysis machine learning (ML) model 116, recommendation subsystem 118, recommendation ML models 119, clustering ML model 120, and training subsystem 122 are stored in different memory components of different computing systems. In additional or alternative embodiments, the program code described above is stored in one or more other memory components accessible via a data network.

In some embodiments, one or more of these data sets, models, and functions are stored in the same memory component (e.g., the memory component 1004). For example, a device, such as the computing environment 100 depicted in FIG. 1, can host the item management subsystem 112, feedback management subsystem 114, communication subsystem 115, sentiment analysis machine learning (ML) model 116, recommendation subsystem 118, recommendation ML models 119, clustering ML model 120, and training subsystem 122. In additional or alternative embodiments, one or more of the programs, data sets, models, and functions described herein are stored in one or more other memory components accessible via a data network.

The computing device 1000 also includes a network interface device 1010. The network interface device 1010 includes any device or group of devices suitable for establishing a wired or wireless data connection to one or more data networks. Non-limiting examples of the network interface device 1010 include an Ethernet network adapter, a modem, and the like. The computing device 1000 is able to communicate with one or more other computing devices via a data network using the network interface device 1010.

Figure 11:
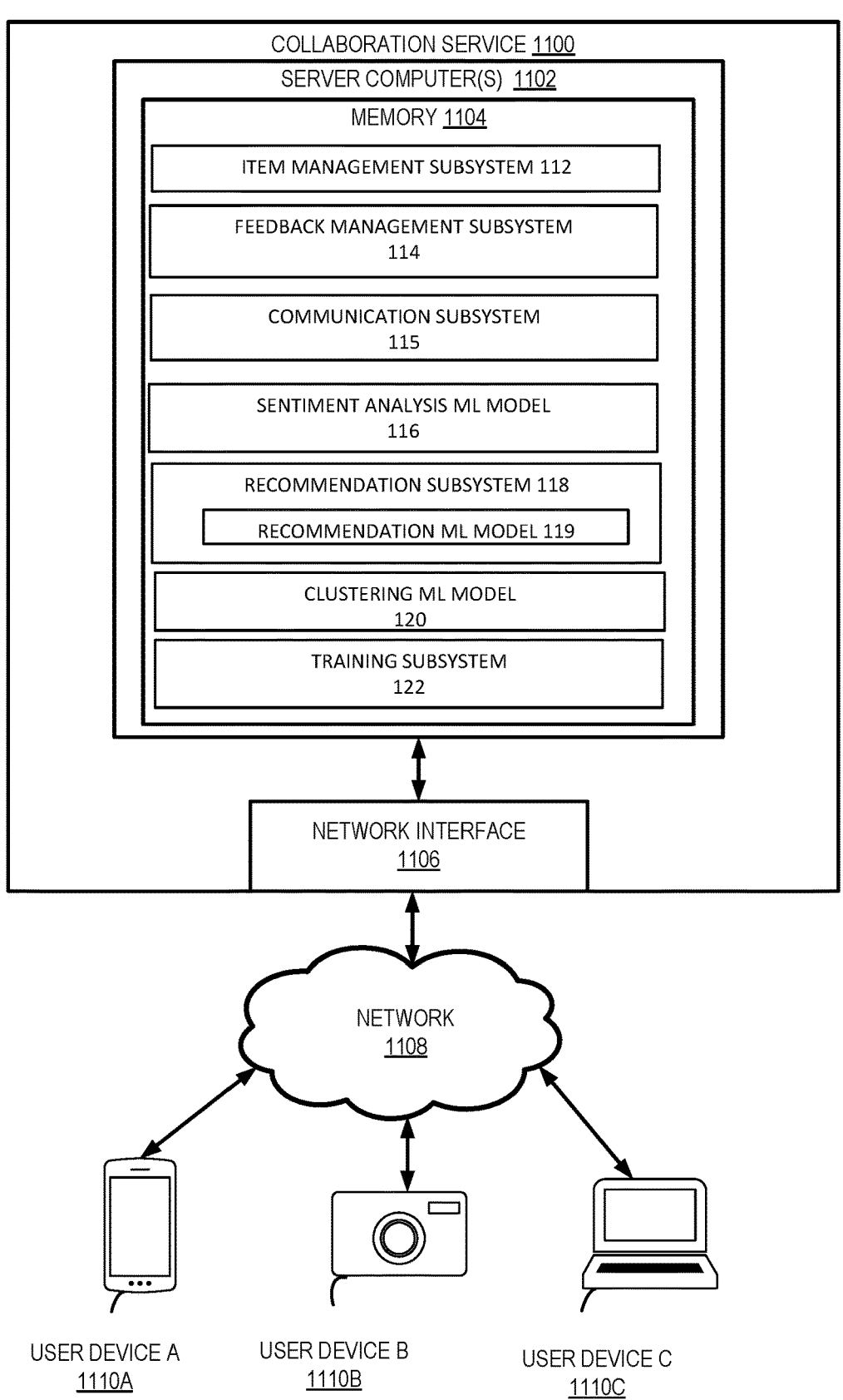
FIG. 11 depicts another example of a computing system that performs certain operations described herein, according to certain embodiments of the present disclosure.

In some embodiments, the functionality provided by the computing device 1000 may be offered as a cloud-based collaboration service 1100 by a cloud service provider. For example, FIG. 11 depicts an example of a cloud-based collaboration service 1100 offering one or more collaboration services that can be used by a number of user subscribers using user devices 1110A, 1110B, and 1110C across a network 1108. In certain embodiments, the collaboration services provided by the collaboration service 1100 include a service that identifies and displays information associated with items based on information provided by the user devices 1110A, 1110B, and 1110C. In some cases, the collaboration services may be offered under a Software as a Service (SaaS) model. One or more users may subscribe to the collaboration services, and the collaboration service 1100 performs the processing to provide the collaboration services to subscribers. The collaboration service 1100 may include one or more remote server computer(s) 1102.

The remote server computer(s) 1102 include any suitable non-transitory computer-readable medium for storing program code (e.g., code for the item management subsystem 112, feedback management subsystem 114, communication subsystem 115, sentiment analysis machine learning (ML) model 116, recommendation subsystem 118, recommendation ML models 119, clustering ML model 120, and/or training subsystem 122), which is used by the collaboration service 1100 for providing the cloud services. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the server computer(s) 1102 can include volatile memory, non-volatile memory, or a combination thereof.

One or more of the server computer(s) 1102 execute the program code (e.g., via the item management subsystem 112, feedback management subsystem 114, communication subsystem 115, sentiment analysis machine learning (ML) model 116, recommendation subsystem 118, recommendation ML models 119, clustering ML model 120, and training subsystem 122) that configures one or more processors of the server computer(s) 1102 to perform one or more of the operations that provide interactive collaboration services, such as gathering an analyzing feedback from multiple users and identifying and recommending items based on the analysis. Any other suitable systems or subsystems that perform one or more operations described herein (e.g., a subsystem for generating tracking information) can also be implemented by the collaboration service 1100.

In certain embodiments, the collaboration service 1100 may implement the services by executing program code and/or using program data, which may be resident in a memory component of the server computer(s) 1102 or any suitable computer-readable medium and may be executed by the processors of the server computer(s) 1102 or any other suitable processor.

The collaboration service 1100 also includes a network interface device 1106 that enables communications to and from the collaboration service 1100. In certain embodiments, the network interface device 1106 includes any device or group of devices suitable for establishing a wired or wireless data connection to the network 1108. Non-limiting examples of the network interface device 1106 include an Ethernet network adapter, a modem, and/or the like. The collaboration service 1100 is able to communicate with the user devices 1110A, 1110B, and 1110C via the network 1108 using the network interface device 1106.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments.

Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method comprising:

receiving, by a feedback management subsystem from a first user, first text comprising commentary on an item;

receiving, by the feedback management subsystem from the first user, instructions to request commentary on the item from a second user;

responsive to receiving the instructions to request commentary from the second user, transmitting, by a communication subsystem, a notification to the second user;

receiving, by the feedback management subsystem from the second user, second text comprising commentary on the item;

using a sentiment analysis machine learning model, performing sentiment analysis to identify a sentiment of the first text and a sentiment of the second text;

identifying, by a recommendation subsystem, one or more prior actions of the first user and one or more associated sentiments of the second user;

receiving, by the feedback management subsystem from a third user, third text comprising commentary on the item;

using the sentiment analysis machine learning model, performing sentiment analysis to identify a sentiment of the third text to identify one or more sentiments of the third user associated with the one or more prior actions of the first user, wherein the one or more sentiments of the second user are assigned a first weight based on a correlation between the one or more prior actions of the first user and the one or more sentiments of the second user and the one or more sentiments of the third user are assigned a second weight based on a correlation between the one or more prior actions of the first user and the one or more sentiments of the second user;

using a recommendation machine learning model, identifying a second item based on the one or more prior actions of the first user, the one or more sentiments of the second user, and the one or more sentiments of the third user, wherein the recommendation machine learning model applies the first weight and the second weight in identifying the second item; and providing, by the recommendation subsystem to the first user, output recommending the second item.

2. The method of claim 1, further comprising:

receiving, by the feedback management subsystem from the first user, instructions to request commentary on the item from the third user; and responsive to receiving the instructions to request commentary from the third user, transmitting, by the communication subsystem, a notification to the third user, wherein the third text comprising commentary on the item is received responsive to the notification to the third user.

3. The method of claim 2, further comprising:

receiving, by the feedback management subsystem, input from the first user identifying a first channel for contacting the second user and a second channel for contacting the third user, wherein the notifications are transmitted to the second user and the third user via the selected channels.

4. The method of claim 3, wherein:

the first channel is a social media platform; and the second channel is email or text.

5. The method of claim 1, further comprising:

using a third machine learning model, based on the one or more sentiments of the second user and respective items associated with the one or more sentiments of the second user, identifying a third item that the second user would be likely to recommend; and displaying, by the recommendation subsystem to the first user, an indication that the second user would be likely to recommend the third item.

6. The method of claim 1, further comprising:

displaying, via a graphical user interface, the item, the first text and the second text.

7. The method of claim 1, further comprising:

grouping, by a fourth machine learning model, a set of related items together, the recommendation subsystem further configured to provide the set of related items to the first user.

8. The method of claim 1, further comprising:

displaying, by an item management subsystem to the first user, a plurality of items including the item;

receiving, by the item management subsystem from the first user, selection of the item; and displaying, by the feedback management subsystem to the first user, a first interface element for accepting text data and a second interface element for contacting another user, wherein first text is received via the first interface element and the instructions to contact the second user are received via the second interface element.

9. A computing system comprising:

a feedback management subsystem configured to:

receive, from a first user, first text comprising commentary on an item;

receive, from the first user, instructions to request commentary on the item from a second user; and receive, from a third user, third text comprising commentary on the item;

a communication subsystem configured to transmit a notification to the second user, responsive to receiving the instructions to request commentary from the second user;

the feedback management subsystem further configured to receive, from the second user, second text comprising commentary on the item;

a sentiment analysis machine learning model configured to:

perform sentiment analysis to identify a sentiment of the first text and a sentiment of the second text;

perform sentiment analysis to identify a sentiment of the third text to identify one or more sentiments of the third user associated with the one or more prior actions of the first user, wherein the one or more sentiments of the second user are assigned a first weight based on a correlation between the one or more prior actions of the first user and the one or more sentiments of the second user and the one or more sentiments of the third user are assigned a second weight based on a correlation between the one or more prior actions of the first user and the one or more sentiments of the second user;

a recommendation subsystem configured to identify one or more prior actions of the first user and one or more associated sentiments of the second user;

a recommendation machine learning model configured to identify a second item based on the one or more prior actions of the first user, the one or more sentiments of the second user, and the one or more sentiments of the third user, wherein the recommendation machine learning model applies the first weight and the second weight in identifying the second item; and the recommendation subsystem further configured to provide, to the first user, output recommending the second item.

10. The system of claim 9, wherein:

the feedback management subsystem is further configured to receive, from the first user, instructions to request commentary on the item from the third user; and the communication subsystem is further configured to transmit a notification to the third user responsive to receiving the instructions to request commentary from the third user, wherein the third text comprising commentary on the item is received responsive to the notification to the third user.

11. The system of claim 10, wherein:

the feedback management subsystem is further configured to receive input from the first user identifying a first channel for contacting the second user and a second channel for contacting the third user; and the notifications are transmitted to the second user and the third user via the selected channels.

12. The system of claim 9, further comprising:

a third machine learning model configured to identify a third item that the second user would be likely to recommend based on the one or more sentiments of the second user and respective items associated with the one or more sentiments of the second user, wherein the recommendation subsystem is further configured to display, to the first user, an indication that the second user would be likely to recommend the third item.

13. The system of claim 9, further comprising:

a fourth machine learning model configured to group a set of related items together, wherein the recommendation subsystem is further configured to provide the set of related items to the first user.

14. The system of claim 9, further comprising:

an item management subsystem configured to:

display, to the first user, a plurality of items including the item;

receive, from the first user, selection of the item; and the feedback management subsystem further configured to display, to the first user, a first interface element for accepting text data and a second interface element for contacting another user, wherein first text is received via the first interface element and the instructions to contact the second user are received via the second interface element.

15. A non-transitory computer-readable medium storing executable instructions, which when executed by a processing device, cause the processing device to perform operations comprising:

receiving, by a feedback management subsystem from a first user, first text comprising commentary on an item;

receiving, by the feedback management subsystem from the first user, instructions to request commentary on the item from a second user;

responsive to receiving the instructions to request commentary from the second user, transmitting, by a communication subsystem, a notification to the second user;

receiving, by the feedback management subsystem from the second user, second text comprising commentary on the item;

using a sentiment analysis machine learning model, performing sentiment analysis to identify a sentiment of the first text and a sentiment of the second text;

identifying, by a recommendation subsystem, one or more prior actions of the first user and one or more associated sentiments of the second user;

receiving, by the feedback management subsystem from a third user, third text comprising commentary on the item;

using the sentiment analysis machine learning model, performing sentiment analysis to identify a sentiment of the third text to identify one or more sentiments of the third user associated with the one or more prior actions of the first user, wherein the one or more sentiments of the second user are assigned a first weight based on a correlation between the one or more prior actions of the first user and the one or more sentiments of the second user and the one or more sentiments of the third user are assigned a second weight based on a correlation between the one or more prior actions of the first user and the one or more sentiments of the second user;

using a recommendation machine learning model, identifying a second item based on one or more prior actions of the first user, the one or more sentiments of the second user, and the one or more sentiments of the third user, wherein the recommendation machine learning model applies the first weight and the second weight in identifying the second item; and providing, by a recommendation subsystem to the first user, output recommending the second item.

16. The medium of claim 15, the operations further comprising:

receiving, by the feedback management subsystem from the first user, instructions to request commentary on the item from the third user; and responsive to receiving the instructions to request commentary from the third user, transmitting, by the communication subsystem, a notification to the third user, wherein the third text comprising commentary on the item is received responsive to the notification to the third user.

17. The medium of claim 14, the operations further comprising:

using a third machine learning model, based on the one or more sentiments of the second user and respective items associated with the one or more sentiments of the second user, identifying a third item that the second user would be likely to recommend; and displaying, by the recommendation subsystem to the first user, an indication that the second user would be likely to recommend the third item.

* * * * *